INVENTOR.
JOHN S. ECKERT
BY
ATTORNEY

Dec. 31, 1968 J. S. ECKERT 3,419,253
SUPPORT PLATE
Original Filed April 1, 1959 Sheet 2 of 3

INVENTOR.
JOHN S. ECKERT
BY
ATTORNEY

United States Patent Office 3,419,253
Patented Dec. 31, 1968

3,419,253
SUPPORT PLATE
John S. Eckert, Silver Lake, Ohio, assignor by mesne assignments, to U.S. Stoneware Inc., a corporation of Massachusetts
Continuation of application Ser. No. 208,180, July 2, 1962, which is a continuation of application Ser. No. 803,430, Apr. 1, 1959. This application Nov. 8, 1965, Ser. No. 512,258
1 Claim. (Cl. 261—96)

This application is a continuation of my application Ser. No. 208,180 filed July 2, 1962 (now abandoned) which was a continuation of my application Ser. No. 803,430 filed Apr. 1, 1959 (now abandoned).

This invention relates to a support plate for the support of a bed of packing elements in a packed treating tower. Such towers are designed to bring a gas and liquid into intimate contact so as to effect either a mass transfer or a heat transfer from one to the other.

The suport plate is provided with openings to permit gases to pass up through it and liquids to pass through it. It comprises a plurality of arches which extend from one side of the tower to the other. These arches are each straight and parallel to one another. There are slots in the sides of each arch and smaller openings in the crown at the top of the arch for the passage of gases up through the support plate. The liquid flowing down through the tower drains off the arches through openings in a base which extends substantially horizontally outward from the base of one arch to the base of the next arch. The support plates are thus designed for the gas to pass through openings located above the openings through which the liquid drains.

The tower is ordinarily cylindrical, but may be square, hexagonal, or any shape. It may be constructed of concrete, steel, or any suitable construction material.

The support plate may be composed of any material customarily used for the purpose, such as metal, plastic, etc., but is preferably of ceramic composition. For towers measuring up to five feet and more across, a support plate of porcelain made up of beams each measuring 12 to 18 inches across, as illustrated in the accompanying drawings, has been used to support a bed of packing elements and treating liquid without the necessity for any interior support.

The support plate may be made of one piece or of more than one piece. For the larger towers the support plate is advantageously made up of individual beams each of which includes a single arch. For very large towers such as those measuring more than five feet across, if the beams are of a ceramic composition, internal piers may be required to support them at one or more points between their ends. For small towers a single plate may be used which covers the whole of the interior of the tower and comprises a plurality of arches; or two such plates may be used, each of which covers one-half of the area within the tower.

The invention will be further described in connection with the drawings, in which—

The tower 1 may be of any usual design. It is shown as cylindrical and its walls are shown as composed of concrete. It includes the ledge 3 which protrudes inwardly throughout its whole circumference a distance sufficient to support the ends of the support plate which is composed of three arched beams 5, 6 and 7. These arches are ordinarily relatively narrow, being substantially taller than they are wide.

Figure 1:
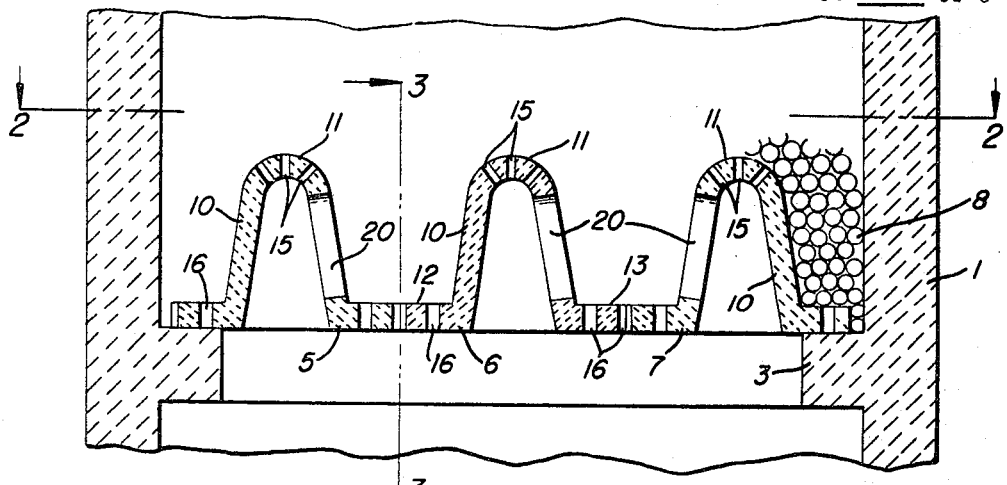
FIGURE 1 is a section through a tower and through three separate support-plate beams on the line 1—1 of FIGURE 2.
Figure 2:
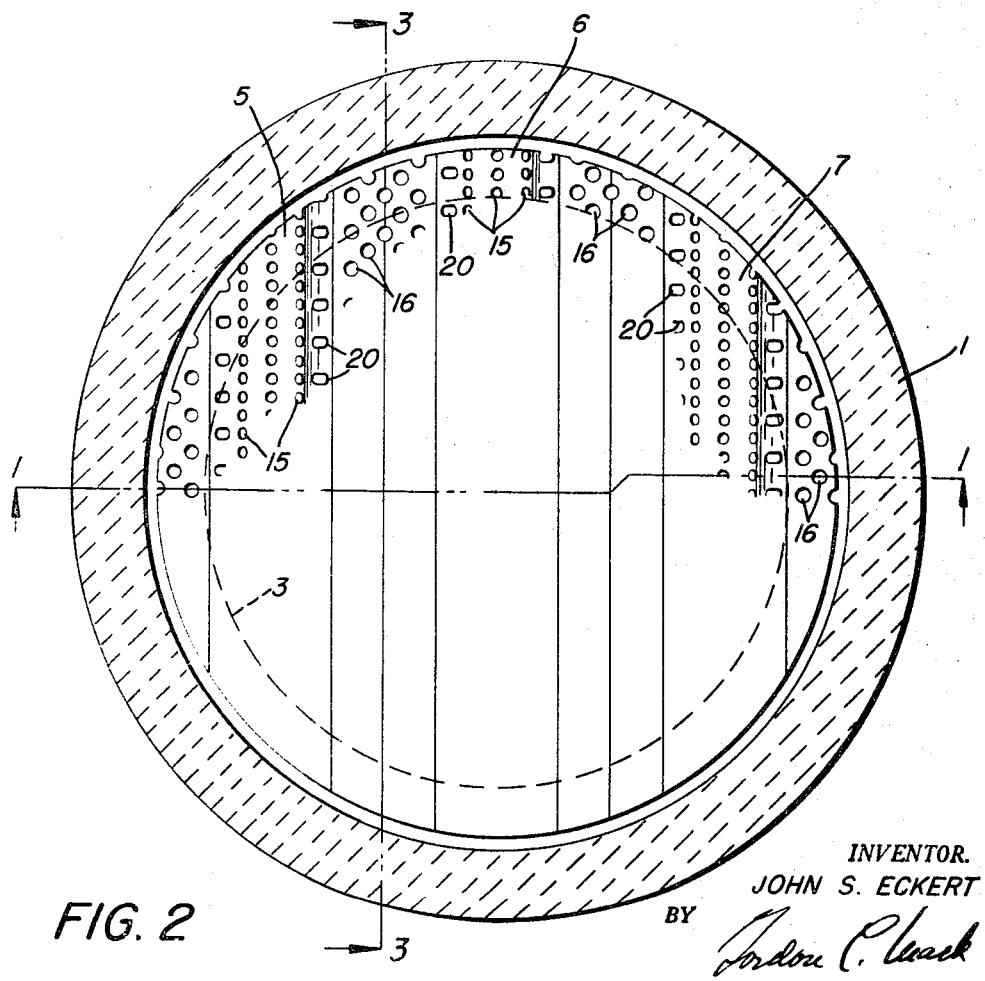
FIGURE 2 is a plan view of the support plate on the line 2—2 of FIGURE 1 and shows a section through the tower wall.
Figure 3:
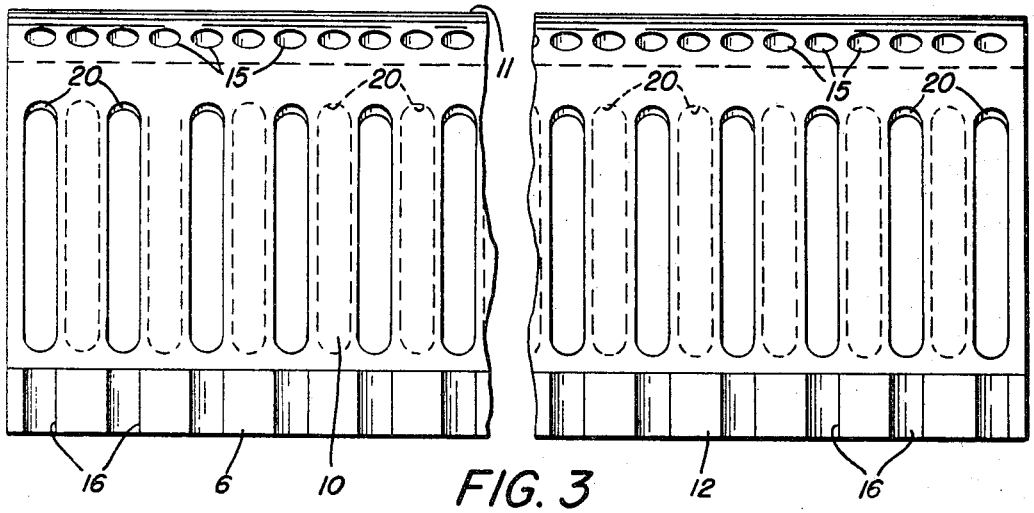
FIGURE 3 is a side view of the middle beam on the line 3—3 of both FIGURES 1 and 2.

Porcelain support plate arches for larger towers, such as shown in FIGURES 1–3 of the drawings, are made in great lengths and then, after firing, they are cut to size and shaped at their edges to fit into a tower. The ends of the finished arches are blocked by the tower wall, or by shims or the like where the fit of the individual beams is not precise enough to prevent the falling of packing elements 8 through the ends of the arch. The tower may, for example, have an inside diameter of four feet, just equal to the width of three support-plate beams each 16 inches wide. FIGURE 3 shows a side view of beam 6 and its construction will be discussed in detail, it being understood that the other beams are of the same construction.

The side walls 10 of each arch are relatively flat and incline inwardly toward the rounded crown 11. By inwardly sloping the arch or riser toward the crown, the available free space in the packed bed is increased as the amount of gas which has moved from the arch into the packed bed has increased, thereby creating a minimum amount of interference with the operation of the tower because of the support plate. The packing elements are so small that a plurality are located side by side in the narrowest space between each two arches.

Integral base members 12 and 13 extend horizontally outward from the base of their respective walls. The distance from the outside edge of one base means to the outside edge of the other base means is about twice the distance between the outside surfaces of the base of the arch at the level of the top of the base means.

In the crown 11 there are three rows of circular openings 15, each opening being, for example, about ¾-inch in diameter. These permit the escape of gas from under the crown. The circular drainage openings 16 in the base members 12 and 13 may be larger or smaller than the openings 15. They are arranged in two to three rows. Openings 15 and 16 are provided throughout the length of the arch. They may be of any desired shape, and arranged in any pattern.

The slots 20 are staggered in opposite walls of the arch. They may, for example, measure about 7 inches in length and be 1⅛ inches wide. They are preferably spaced so that the distance between them is about 1½ times their width. It will be noted that the slots do not extend to the level of the base members 12 and 13, but they terminate a fraction of an inch above the level of these base members so that liquid collecting on the base members does not flow through the slots.

The foregoing dimensions of the circular openings and the slots refer to dimensions after firing. The area of each of the openings in the crown and base members is much less than the area of each slot openings in the wall. This provides strength at the locations where it will do the most good minimizes liquid counterflow in the gas and yet provides free area for the passage of the gas.

The drawings show a preferred arrangement of the openings in the support plates. The openings 15 in the preferred structure are arranged in three parallel rows, and the openings are side by side in cross rows. These cross rows are twice as close together as the slots in the respective side walls. Thus slots in one wall are aligned with alternate cross rows. In each base member, there are two rows of openings and one row of half openings along the edge. The openings in these different rows are staggered to provide greatest strength, and are aligned with the cross rows above mentioned.

Figure 4:
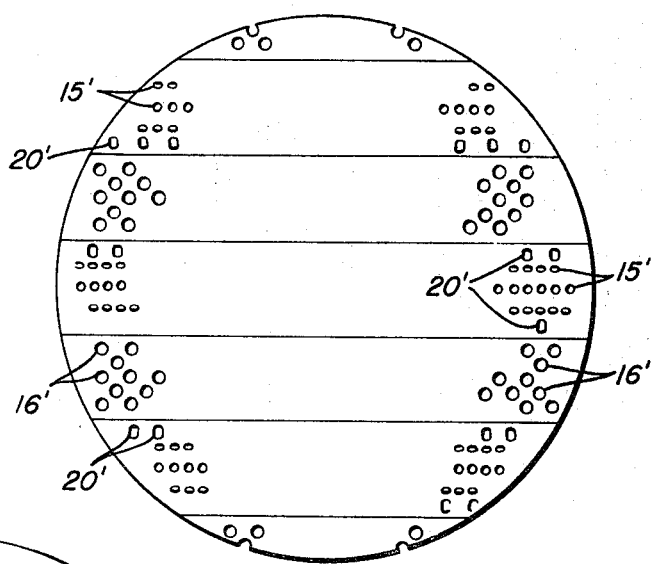
FIGURE 4 is a plan view of a circular support plate which includes a plurality of arches.
Figure 5:
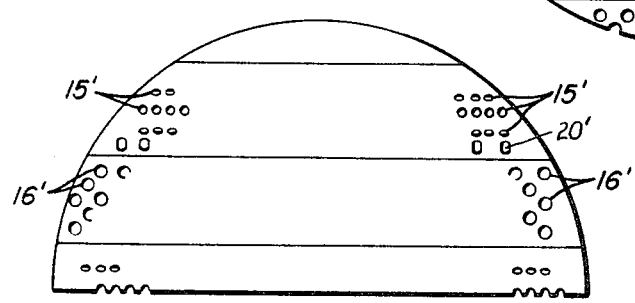
FIGURE 5 is a plan view of a semi-circular support plate which includes a plurality of arches.
Figure 6:
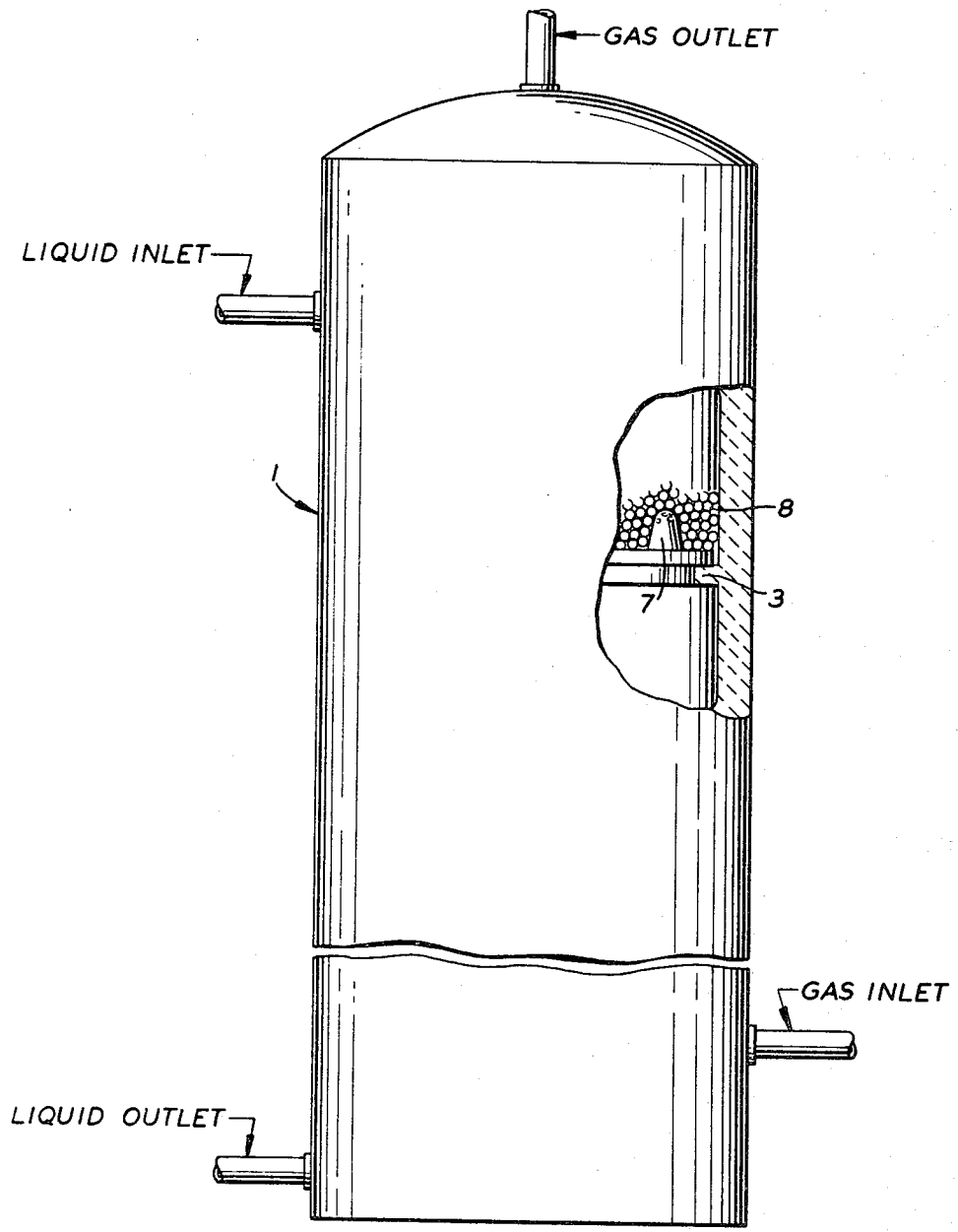
FIGURE 6 is an elevation of a tower with a part of the wall broken away to show a portion of the support member and the bed of packing elements.

The circular support plate of FIGURE 4 and the semicircular support plate of FIGURE 5 are each made as a separate unit and include a plurality of arches extending from one side of the tower to the other, with each two adjacent arches separated by a horizontal base member. There are slots 20' in the arches, openings 15' in the tops of the arches, and openings 16' in the base members between the arches. Circular support plates such as shown in FIGURE 4 are designed for use in smaller towers up to, for example, 4 ft. in diameter. For towers of this size or somewhat larger, two complementary semi-circular support plates such as shown in FIGURE 5 can be employed. Larger porcelain support plates comprising a number of arches would be too heavy to be practical, and they are therefore advantageously made as beams, each comprising a single arch, as described and illustrated in FIGURES 1–3.

The preferred design shown in the drawings has great strength. The tops of the arches might be squared off, but such construction would not be as strong as that illustrated. The slots need not be staggered on opposite sides of the arches, but this, too, would weaken the arches. The slots need not be the same size and shape. The openings in the crown and base means are preferably circular, but need not be. Vertical side walls would not be as efficient for the passage of gas and would not be as strong as converging side walls, as shown. The integral base members might extend from only one side of the bottom of each arch, but the design shown in preferred.

What I claim is:
1. A treating tower having
   (a) a gas inlet and liquid outlet in the lower region thereof and a liquid inlet and gas outlet in the upper region thereof,
   (b) a support member for packing which member is mounted in the tower on the wall thereof between the gas and liquid inlets,
   (c) said packing support member comprising a plurality of parallel arched members each having a horizontally disposed base member extending from each side of each arch, each base member having openings therein to permit the flow of liquid therethrough, said support member forming a support over the entire cross section of the tower,
   (d) said arched members each having inclined side walls converging upwardly toward respective crowns thereof, said side walls each having upwardly extending, relatively narrow, elongated slots therein staggered on each side of each arch to provide for the upward flow of gas therethrough and said crowns each having openings therein, the area of each opening in the crowns and in each base member being less than the area of each slot, said slots terminating above the tops of the respective base members a sufficient distance to provide for the collection of liquid on the base members, the openings in each member being arranged in parallel longitudinal rows and being staggered with each opening in one row in line with each slot in the adjacent wall of the arch and located between the slots of the adjacent side wall, there being twice as many openings in each row in the crown as there are slots in one wall of the arch, each arch being taller than it is wide at its widest portion, and
   (e) a plurality of packing elements in said tower supported upon said support member,
   (f) said arched members being positioned contiguously with respect to one another and providing an upwardly widening space between the side walls of adjacent arch members, above the underlying base members,
   (g) said space being filled with a plurality of said packing elements.

References Cited

UNITED STATES PATENTS

| 999,320 | 8/1911 | Kyll | 261—95 X |
| 1,475,243 | 11/1923 | Piron | 261—98 |
| 2,767,967 | 10/1956 | Hutchinson | 261—113 |
| 2,803,528 | 8/1957 | Erdman | 261—113 |
| 3,016,234 | 1/1962 | Huppmeier | 261—98 |

FOREIGN PATENTS 219,458   3/1910   Germany.

OTHER REFERENCES

"Support Plates and Distributors for Packed Towers," Bulletin TA-30, U.S. Stoneware Co., Akron, Ohio, Nov. 15, 1957 (pp. 4 to 9 and 22 relied on).

RONALD R. WEAVER, *Primary Examiner.*

U.S. Cl. X.R.

23—285; 261—97